Feb. 14, 1956 P. W. DOUGLAS 2,734,707
SUPPORT FOR LAUNDRY MACHINES
Filed July 25, 1950 5 Sheets-Sheet 1

INVENTOR
PEYTON W. DOUGLAS
BY
ATTORNEY

Feb. 14, 1956   P. W. DOUGLAS   2,734,707
SUPPORT FOR LAUNDRY MACHINES
Filed July 25, 1950   5 Sheets-Sheet 3

INVENTOR
PEYTON W. DOUGLAS
BY *J. P. Keiper*
ATTORNEY

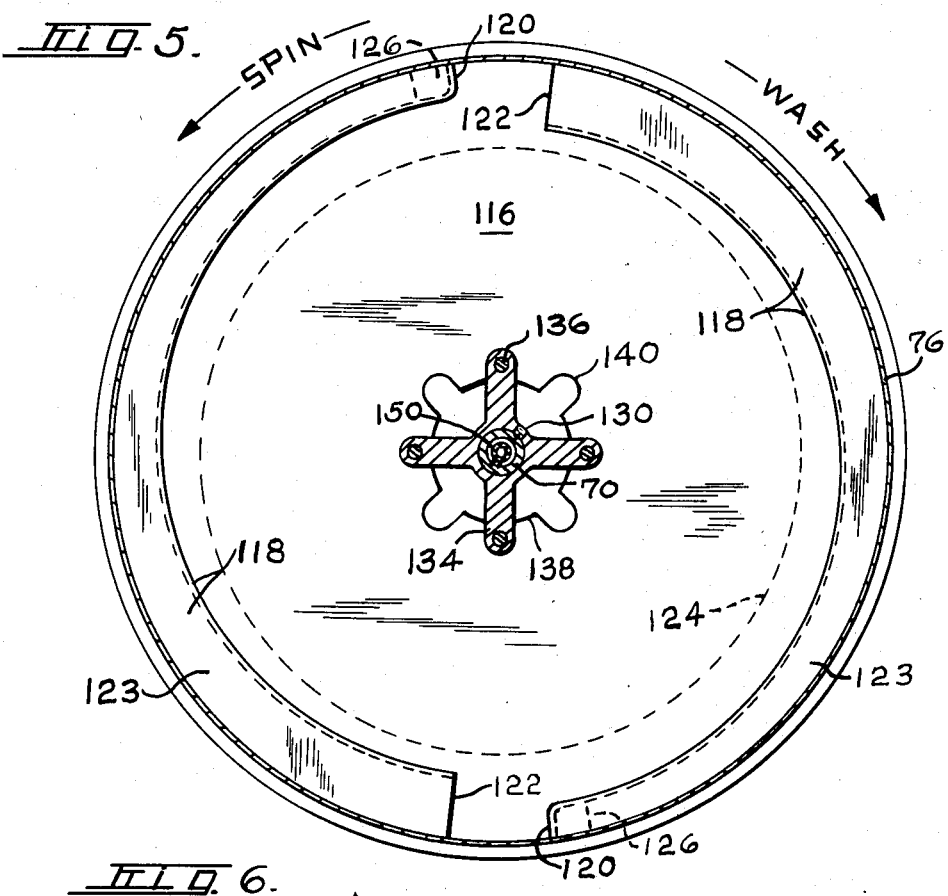

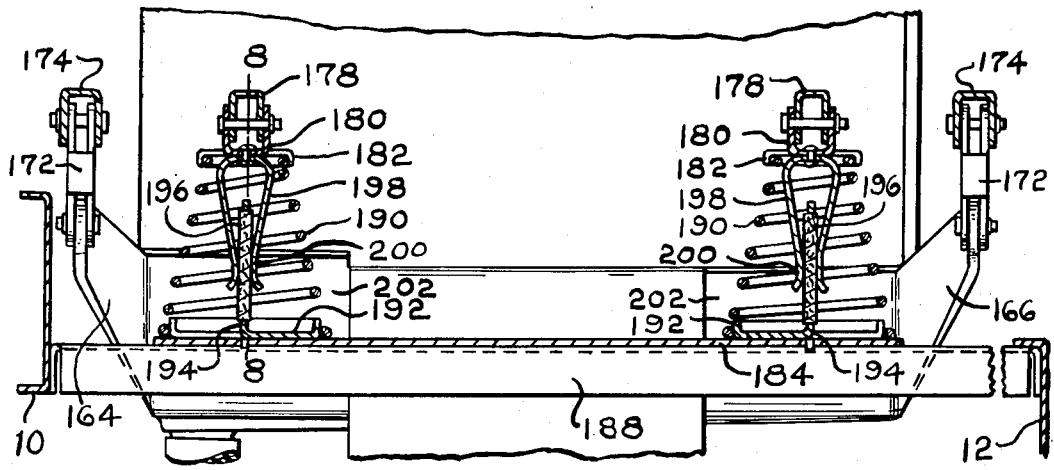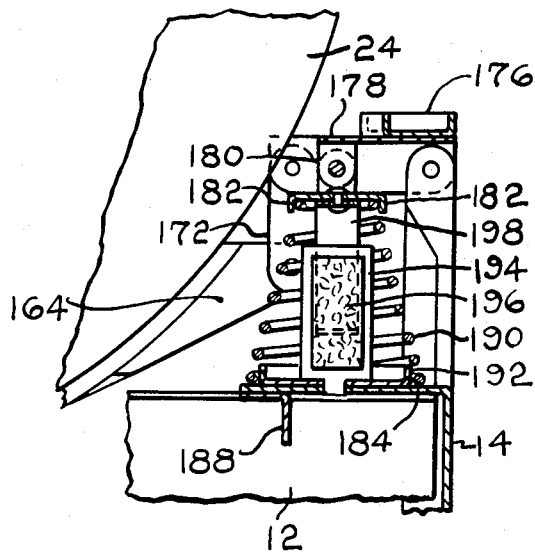

United States Patent Office 2,734,707
Patented Feb. 14, 1956

2,734,707

SUPPORT FOR LAUNDRY MACHINES

Peyton W. Douglas, Syracuse, N. Y., assignor, by mesne assignments, to The Murray Corporation of America, Detroit, Mich., a corporation of Delaware Application July 25, 1950, Serial No. 175,828

2 Claims. (Cl. 248—18)

This invention relates to laundry apparatus, of the centrifugal rinsing and extraction type, and more particularly to a supporting structure therefor. The application is a division of my copending application Serial No. 775,237, filed September 20, 1947, now Patent 2,637,189.

It is desirable to provide a suspension permitting the revolving drum or washing unit some freedom of movement, so that vibratory forces may not be transmitted to the supporting structure, and so that the drum may, at high speed, rotate about its actual center of gravity which may vary in practice due to uneven distribution of laundry during the extracting cycle.

Accordingly, an object of the invention is to provide a resilient support for such apparatus to absorb and prevent to a substantial degree the transmission of side forces to the supporting floor, resulting from unbalanced loads during spin drying. Further, the invention has to do with providing a resilient support so constructed and arranged as to minimize resonant phenomena, and which may be provided with suitable damping means to absorb and dissipate a fraction of the energy resulting from the motion created by such unbalanced forces.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 5 is a section taken substantially on the line 5—5 of Figure 2;

Figure 6 is a composite fragmentary figure illustrating in perspective the annular passageway construction;

Figure 7 is a section taken on the line 7—7 of Figure 1, showing the resilient frictional support mechanism; and Figure 8 is a section taken substantially on the line 8—8 of Figure 7.

Figure 1:
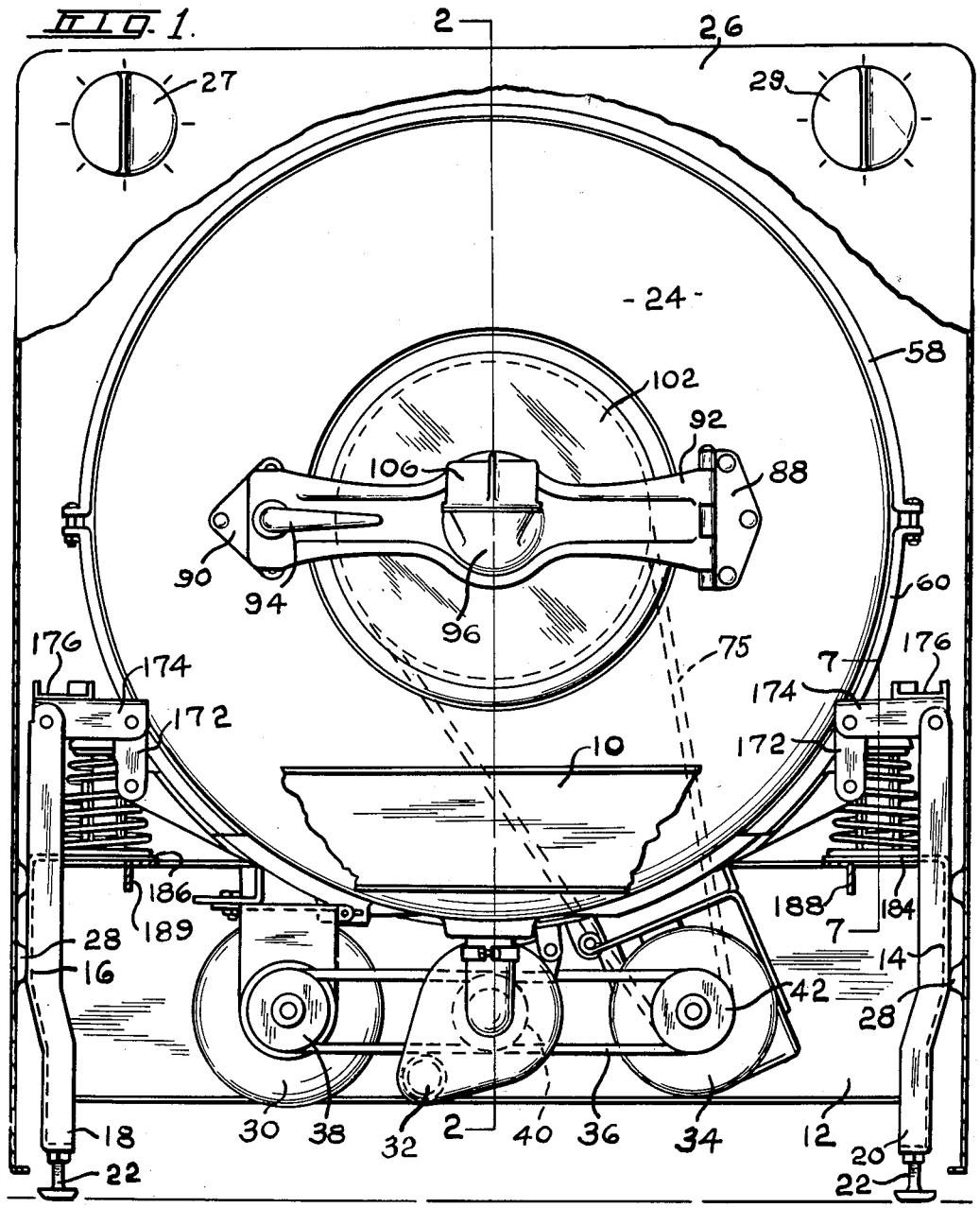
Figure 1 is a front elevation of a laundry machine with a portion of the forward cabinet wall broken away.

Referring to Figure 1, there is shown a base frame composed of longitudinal forward and rear channel members 10 and 12 connected by side members 14 and 16, and provided with corner posts 18 and 20 with adjustable feet 22. By a resilient frictional suspension, to be described more in detail hereinafter, there is supported by the frame, a tub construction 24, the same being preferably housed within a cabinet 26, which may be secured to the frame members 14 and 16 by suitable fastening means such as screws at 28. Suitable timing and control devices 27 and 29 may be provided to regulate the quantity of water and to initiate automatic operation of the apparatus. Secured to the bottom side of the tub construction is a reversible electric motor 30, a drain pump 32 operative for either direction of rotation, and a two-speed transmission 34, the units being connected by a common belt drive 36 wrapped upon motor pulley 38, pump pulley 40, and transmission pulley 42.

Figure 2:
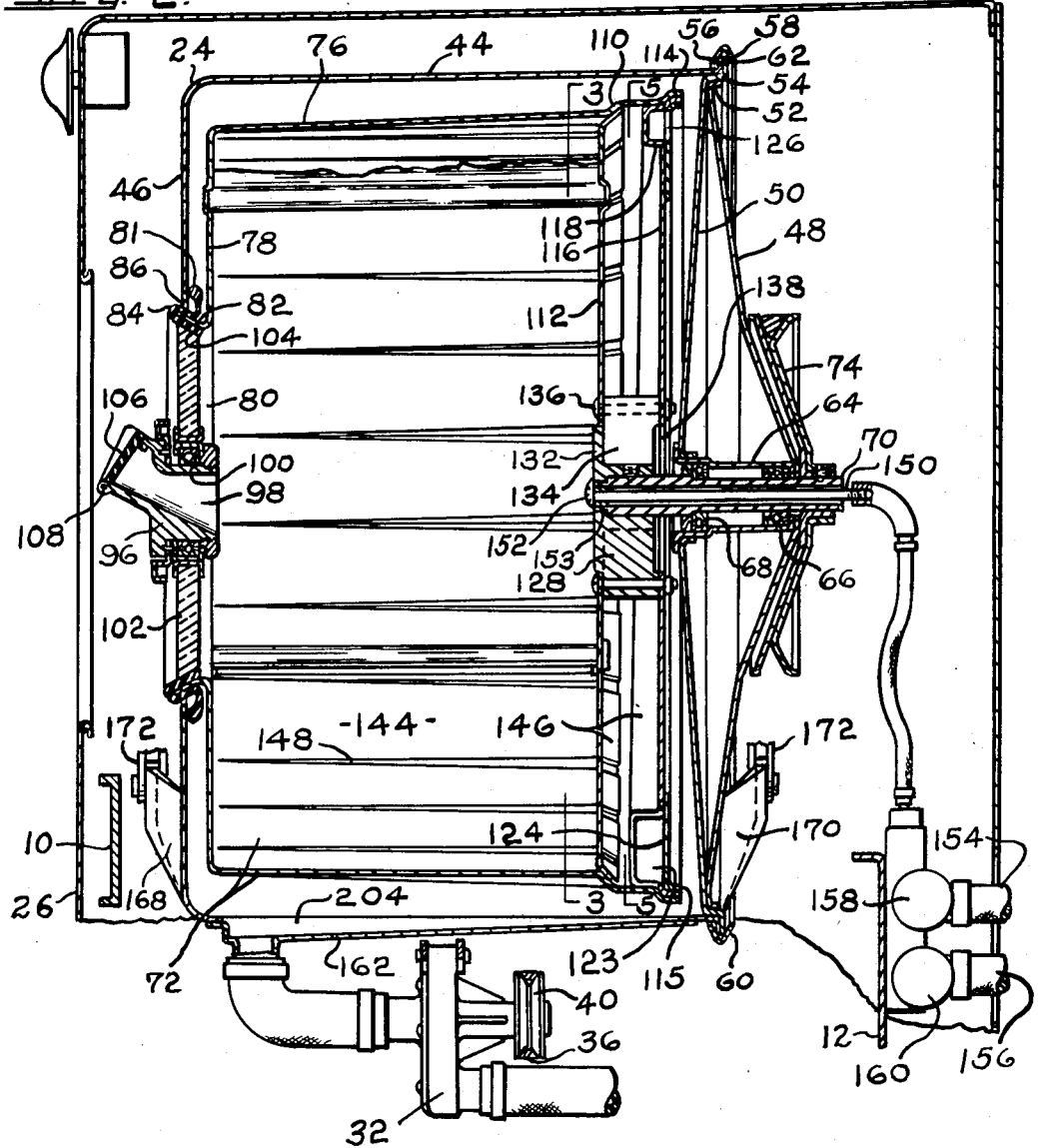
Figure 2 is a longitudinal section through the drum portion of the washing machine, its surrounding tub and cabinet, taken substantially on the line 2—2 of Figure 1.
Figure 3:
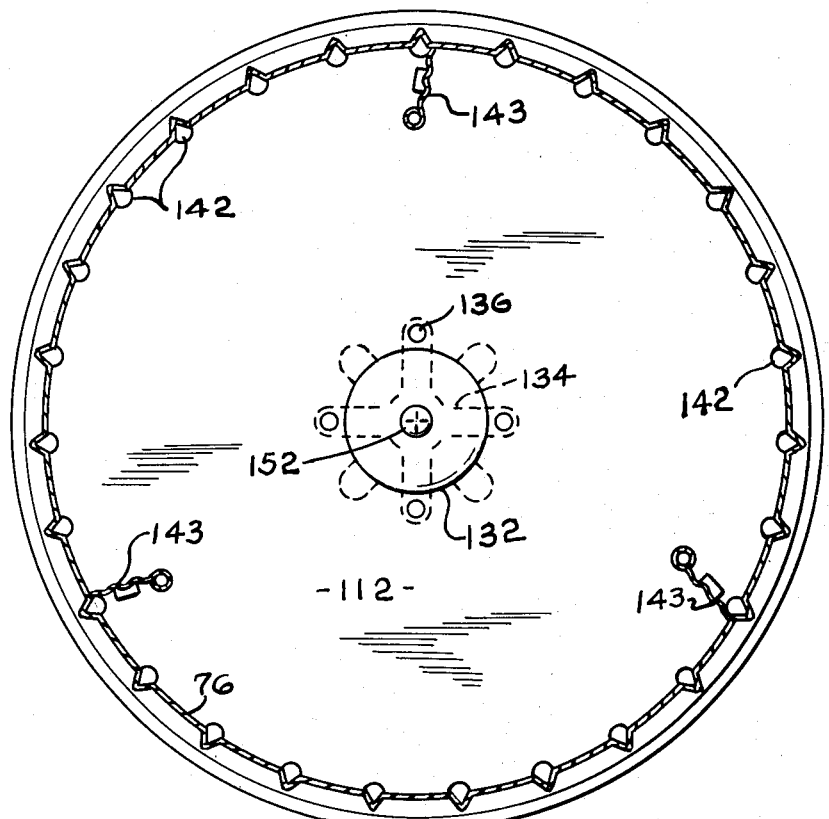
Figure 3 is a transverse section taken substantially on the line 3—3 of Figure 2.

As shown in Figure 2, the tub construction comprises a relatively stationary cylindrical drum 44 having an integral front end 46 and dished spaced rear bearing support plates 48 and 50 joined together by suitable flanges 52 and 54, which may be spot welded or riveted or otherwise secured as may be desired. The bearing support plates, as an assembly, are secured to the rear edge of the cylinder 44 by suitable outward extending flanges 56 and 58 on the cylinder 44 and the plate 50, respectively, a pair of V semi-circular clamping strips 60 and 62 being provided for this purpose. The plates 48 and 50 support a tubular bearing-receiving sleeve 64 containing spaced bearings 66 and 68, that in turn journal a trunnion 70, carrying at its forward end a washing cylinder 72, and at its rearward end a drive pulley 74. The drive pulley 74 is provided with a belt 75, extending to the transmission 34.

The washing cylinder 72 is formed from an open-ended drum-like member having a slightly tapered circular wall 76 and an integral front wall 78. The front wall is provided with a laundry-receiving aperture 80 bounded by an acute angle outwardly flared flange 82, to which is affixed an annular U-section gasket 84 of rubber-like yielding material. The gasket also is provided with an integral slinger ring 81, which may, if desired, lightly touch the inside of wall 46.

The front wall 46 of the stationary drum is provided with an aperture 86 corresponding with the aperture 80 of the revolving drum, on opposite sides of which are a hinge member and latch plate 88 and 90, respectively. Pivotally carried by the hinge member 88 is a transverse door support bar 92 adapted to carry a latch 94 for cooperation with the latch plate 90 when manually latched in the position shown in Figure 1. The bar 92 at its center point is enlarged in width and provided with an inwardly extending stud 96 of ample diameter to permit of an inclined soap dispensing passage 98 therethrough. The stud is also provided on its exterior with a ball bearing 100 upon which is rotatably supported a circular transparent disk or door member 102, having a chamfered edge 104 suitably shaped to form a sealing engagement with the resilient gasket 84. The soap dispensing channel 98 is provided with a hinged door 106, hinged at its lower end as at 108, so as to normally maintain the soap dispensing passage closed except when utilized for the purpose indicated.

The slightly tapered circular wall 76 of the laundry-receiving drum is annularly offset at 110 to receive a flanged partition 112 located a short distance inwardly from the end of the drum. The marginal edge of the drum is again offset or bell-mouthed at 114 to receive the flanged edge 115 of an end plate 116. The end plate 116 has stamped therein two arcuate channels 118, the channels being diametrically disposed and adjacent the edge of the end plate 116. Each channel is closed at one end as at 120, the closure wall being formed or drawn from the metal of the end plate. The opposite end of the channel is slit as at 122 from the plate to provide a suitable opening into the channel from the forward side of the plate. An annular ring 124 may be employed to provide a wall for the channels in order to form closed conduits 123 therefrom; the annular wall 124 being provided with two apertures 126 so disposed as to provide a port at the end of each of the conduits opposite from the openings 122 previously described.

The partition 112 and the end plate 116 are provided with a hub block 128 to which the trunnion 70 is secured as by a set screw 130. The block is provided with a circular end flange 132 adapted to form a shoulder to be received in a corresponding aperture in the partition 112. Integral vanes 134 extend beyond the flange 132 and are provided with bolt-receiving apertures so that the partition 112 and end wall 116 may be clamped to the vanes as by bolts 136. The end wall 116, having an aperture 138 too small in diameter to receive the vanes, is notched as at 140 so that the vanes may be passed through the plate to the space between the partition and plate and thereafter rotated 45° for suitable positioning to receive the bolts 136.

Figure 4:
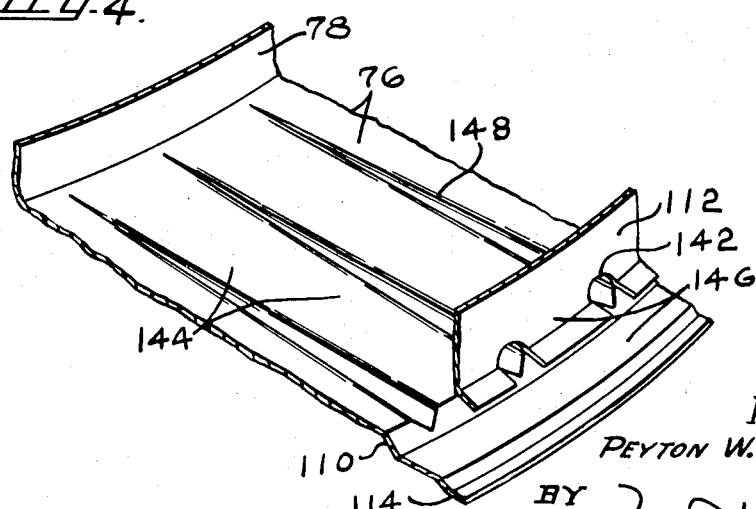
Figure 4 is a fragmentary perspective view of the inside drum construction.

To provide communication between the laundering compartment 144 and the space 146 between the partition 112 and end wall 116, a plurality of elemental grooves 148 are formed preferably uniformly spaced around the circumference of the drum 76, the grooves increasing in depth toward the partition 112, the radial depth closely approaching the radial offset 110 and so that the grooves may blend and drain, centrifugally, into the offset. (See Figure 4.) The partition 112 is suitably notched as at 142 to correspond with the grooves 148 and thereby permit fluid to flow from the compartment 144 to the compartment 146. Baffles 143 provide a degree of agitation.

Water is fed to the drum 76 through the hollow trunnion 70 by means of a non-rotating pipe 150 having a rosette or spray 152 immediately inside the flange 132. Any suitable packing can be provided between the trunnion and pipe to prevent leakage, if desired, as at 153. The pipe 150 may be coupled to hot and cold water supply lines 154 and 156 provided with valves 158 and 160 magnetically and thermostatically or otherwise controlled to cause water of proper temperature to enter the drum 76 in a desired amount. A sump 162 for the drum 44 is arranged at the bottom of the drum 76, the same being coupled to the pump 32, which, in the arrangement shown, is continuously driven to assure drainage of any liquid entering into the drum 44, from whatever source.

The tub assembly 24, because subjected to vibratory forces resulting from the rotation of unbalanced loads within the drum 76, is suspended in a manner to permit a degree of constrained and damped movement. For this purpose, the drum portion 44 is provided with ears 164, 166, 168, and 170 at opposite corners which are suspended from short links 172, which in turn hang from substantially horizontally extending links 174, the latter being pivoted at one end to the upper ends of the legs 18. The fore and aft links 174 at either side of the apparatus are tied together by channel members 176, the torsional stiffness of which is so chosen as to enforce substantially like angular movement of both the fore and aft links on either side of the machine. In addition, the channel members 176 are provided, intermediate the links 174, with arms 178 extending a short distance inwardly, at which point they are pivoted to yokes 180 having integral compression spring receiving cup-like members 182. The transverse members 14 and 16 are flanged as at 184 and 186 to provide a spring base beneath the spring cups 182, the flanges 184 and 186 being stiffened by angular members 188 and 189 extending between the longitudinal frame members 10 and 12.

In order to locate the coil springs 190 held in compression between the flanges 184 and 186 and cups 182 upon the bases so formed, flanged cups 192 secured to the bases 184 and 186 are provided. Each of the cups has a radial section 194 struck therefrom and extending axially of the spring to form an arm, the arms so formed having friction lining 196 molded thereabout. Each of the yokes 180 has affixed to the under side thereof and within their respective coil springs 190, a relatively stiff spring clip 198 having friction arms 200 adapted to frictionally engage the friction lining 196 with sufficient pressure to provide any desired damping effect to vertical movement resulting from force transmitted to the springs 190. The ears 164 may be integral extensions of a saddle member generally indicated as at 202 secured to the bottom of the drum. The drain sump 162 may be integrally formed from such saddle member, the drum 44 being provided with an opening 204 in alignment with the sump 162.

Upon completion of the washing operation, the rotation of the drum may be reversed under which circumstances the conduits 123 are effective to drain the wash water from the drum 76 into the outer casing 44, whence it is drained by the continuously operating pump 32 or by gravity, as the case may be.

After draining off the wash water, rinse water may during such reverse operation be sprayed into the drum for a spray rinse, or the drum may be rotated clockwise and the drum partially filled with rinse water to thereby provide an agitated or deep water rinse. Any number of rinse cycles as described may be performed to complete the rinsing operation, or a combination of agitated and spray rinsing may be resorted to, utilizing the proper rotation direction accordingly.

During the last cycle of rinse operation, when the drum is rotated in a counterclockwise direction to drain the rinse water therefrom, the drum rotation may be increased as the draining off of the rinse water is completed, the two-speed transmission being provided for this purpose. At such time, the laundry within the tub tends to arrange itself in as nearly a balanced condition as is possible, while the speed of the drum increases to that sufficient to extract the water therefrom by centrifugal force. The water so extracted passes out of the drum 76 along the grooves 148, into the compartment 146, from whence it is eliminated by the bailing action of the conduits 123, rotation being in a proper direction (counterclockwise) for drainage. After a sufficient period of time has elapsed for extraction of a substantial portion of the water to produce laundry damp-dried, the spinning is discontinued and thereafter the damp-dried laundry may be removed from the machine.

It will be observed that during the spinning operation, the clothes may not arrange themselves within the drum in perfect balance, so that upon rotation of the drum at a high speed in the neighborhood of 600 R. P. M., considerable vibration of the drum may result. The drum 76 will transmit the vibratory forces to the outer drum 44 both through the rear bearings 68 and 66, as well as the front bearing formed by the door 102 rotating on its journal 100. Through the suspension shown and described, it will be observed that the stationary drum 44 being suspended upon links 172 may move sideways, and being resiliently supported by the coil springs 190, through the supporting links 174 arranged in substantially horizontal position, the drum may move vertically. The rocking action of the drum from side to side produces up and down movement, assuming that the links 174 be held rigid, because of the pendulum or arcuate movement of the short links 172. The up and down forces so created by the transverse movement of the drum 76 are thereby in turn transmitted in the form of vertical movements to the free end of the links 174 which through the channel members 176 and lever arms 178 rock and transmit such motion to the coil springs 190. At the same time, the vertical movement of the coil springs is damped by the friction existing between the wear-resisting friction lining 196 and the friction arms 198. It will be seen that the length of the links 172 determines to a large extent the amount of movement which will be permitted as a result of such unbalanced load within the drum 76 and determines the clearance required by the outer casing 26. If it be assumed that the links 172 were to swing to a 45° angle with the vertical, it will be observed that the lateral force transferred to it would under such circumstances be converted to a vertical force of substantially the same magnitude, which vertical force would then be absorbed by the coil spring and the friction device. The further the links 172 swing, the greater is the ratio between the vertical movement and the lateral movement, causing such vertical movement. The action of links 172 alone is in effect toggle-like. The action of links 174 is merely to constrain the upper ends of links 172 against lateral movement and to transmit the vertical components to the yielding spring support. Thus, the more violent the vibration due to unbalance, the greater is the effectiveness of the springs 190 to cope with such unbalance. The arrangement thus combines in a single vertically active resilient and frictional support, an arrangement for absorbing not only the vertical movements of a revolving drum but the transverse movements as well, together with an apparatus inherently able to variably resist the variable unbalanced loads likely to be presented.

The toggle-like action provides a variable ratio transmission for the forces created by the revolving mass to the resilient support, so that under no practical circumstances can the suspension respond in resonance, since the transmission continuously varies the force ratio with each increment of vibratory movement.

While the laundry unit has been described in detail, to illustrate a unit producing vibration and to which the resilient support is especially adapted, it will be understood that any unit in which vibration occurs during centrifugal extraction may be so supported with substantially the same advantages.

Although a single practical embodiment of the invention has been illustrated and described, it is to be understood that the invention is not limited thereto. As various changes in construction, selection and arrangement of the parts may be made without departing from the spirit of the invention, as will be apparent to those skilled in the art, reference will be had to the appended claims for a definition of the limits of the invention.

What is claimed is:

1. In a support for a washing machine, having an extracting drum rotatable about a substantially horizontal axis extending fore and aft and subject to unbalanced loads, a floating journal supporting frame for the revolving drum, a stationary frame, linkage connecting said journal supporting frame with said stationary frame, said linkage comprising two pairs of horizontal links located on opposite sides of said floating frame with the links of each pair located forward and rearward in respect to the journal frame, and a vertical link depending from each of said horizontal links, each of the vertical links being connected to and supporting the floating frame fore and aft on opposite sides thereof, a rigid element having laterally extending arms connecting the forward and rearward horizontal links of each pair, and upright extending resilient means coacting between said stationary frame and arms for yieldingly maintaining said horizontal links in a substantially horizontal position.

2. In a support for a washing machine, having an extracting drum rotatable about a substantially horizontal axis extending fore and aft and subject to unbalanced loads, a floating journal supporting frame for the revolving drum, a stationary frame, linkage connecting said journal supporting frame with said stationary frame, said linkage comprising two pairs of horizontal links located on opposite sides of said floating frame, each pair comprising a link forward and rearward in respect to the journal frame, and a vertical link depending from each of said horizontal links, each of the vertical links being connected to and supporting the floating frame at points forward and rearward and on opposite sides thereof, a rigid element having laterally extending arms connecting said fore and aft horizontal links, resilient means coacting between said stationary frame and said arms for yieldingly maintaining said horizontal links in a substantially horizontal position, and means for frictionally damping the yielding movement of said resilient means.

References Cited in the file of this patent

UNITED STATES PATENTS

| | | |
|---|---|---|
| 1,973,510 | Schieferstein | Sept. 11, 1934 |
| 1,980,136 | Howe | Nov. 6, 1934 |
| 2,001,562 | Bagley | May 14, 1935 |
| 2,060,784 | Bent | Nov. 17, 1936 |
| 2,243,565 | Kimball et al. | May 27, 1941 |
| 2,318,806 | Sisson et al. | May 11, 1943 |
| 2,414,506 | Bowen | Jan. 21, 1947 |
| 2,454,112 | Woodson | Nov. 16, 1948 |
| 2,526,048 | Russell | Oct. 17, 1950 |
| 2,579,472 | Chamberlin et al. | Dec. 25, 1951 |